United States Patent [19]

Tryon

[11] 4,013,259
[45] Mar. 22, 1977

[54] MOLD APPARATUS FOR FORMING RINGS
[76] Inventor: David H. Tryon, 16880 Wing Lane, La Puente, Calif. 91744
[22] Filed: July 21, 1975
[21] Appl. No.: 597,770
[52] U.S. Cl. .............................. 249/57; 249/102; 425/DIG. 42; 425/180
[51] Int. Cl.² ...................... B22C 9/24; B29C 1/14
[58] Field of Search ............ 249/102, 57, 172, 175, 249/177, 154, 160, 163, 166, 121, 122, 124, 126, 48, 49, 63, 144, 155; 425/803, 180, DIG. 42, DIG. 57; 164/340, 341, 30, 32, 364, DIG. 4

[56] References Cited
UNITED STATES PATENTS

| 481,952 | 9/1892 | Ingram | 249/57 X |
|---|---|---|---|
| 682,098 | 9/1901 | Lyon | 164/DIG. 4 |
| 746,944 | 12/1903 | Ford | 249/57 |
| 913,057 | 2/1909 | Sackett | 249/57 |
| 1,472,975 | 11/1923 | Greenberg | 164/DIG. 4 |
| 1,962,410 | 6/1934 | Rodin | 425/180 X |
| 2,746,402 | 5/1956 | Baxter | 249/175 X |
| 3,511,466 | 5/1970 | Kaplan | 249/57 |
| 3,724,803 | 4/1973 | Goldfarb | 249/102 |
| 3,756,553 | 9/1973 | Ranz | 249/184 X |

Primary Examiner—Francis S. Husar
Assistant Examiner—John S. Brown
Attorney, Agent, or Firm—J. Carroll Baisch

[57] ABSTRACT

A mold apparatus for forming various sizes and shapes of wax castings to provide a means for producing rings in volume therefrom, wherein the mold apparatus comprises a drum member defining the main mold housing having a casting bore of a pre-determined configuration disposed therein, the housing being provided with a pair of removable end plates, the plates being held in place by a tubular support mandrel passing through the cavity and the end plates; wherein a ring-sizing band can be received within the cavity to control the overall size and thickness of the wax casting; and wherein there is included a finger-sizing band adapted to be mounted on the tubular support mandrel within the casting cavity, whereby the selection and arrangement of various sized bands will form numerous ring configurations and sizes when hot wax is injected through an injector inlet port formed between the drum and one of the end plates.

5 Claims, 6 Drawing Figures

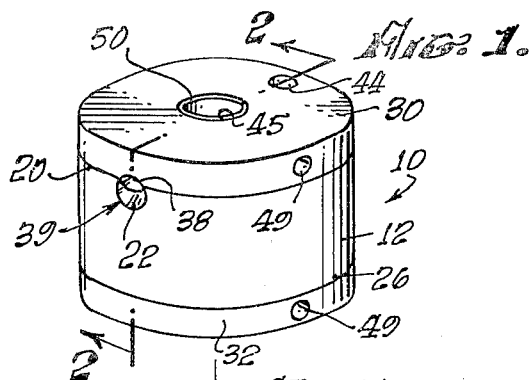
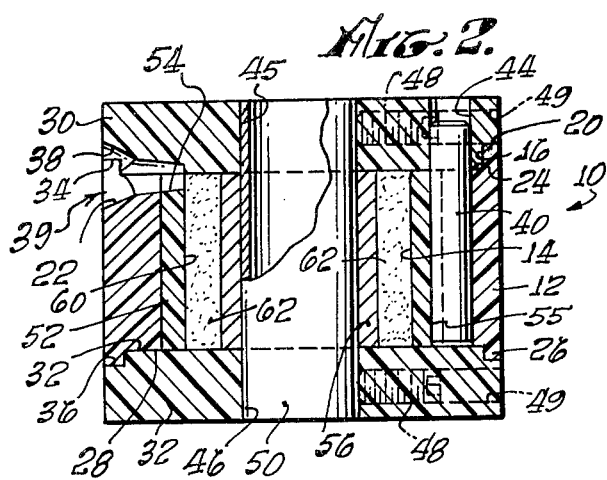
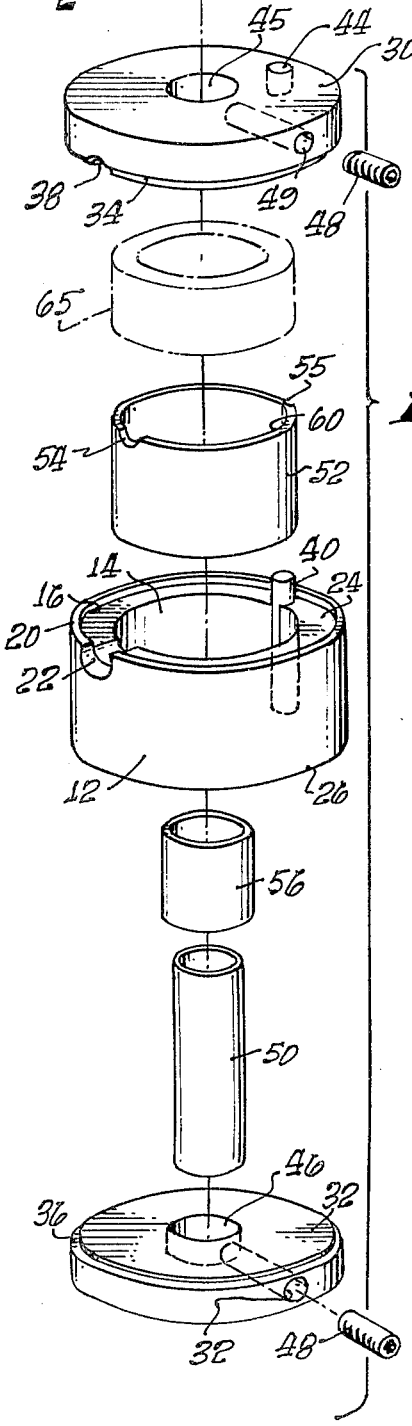
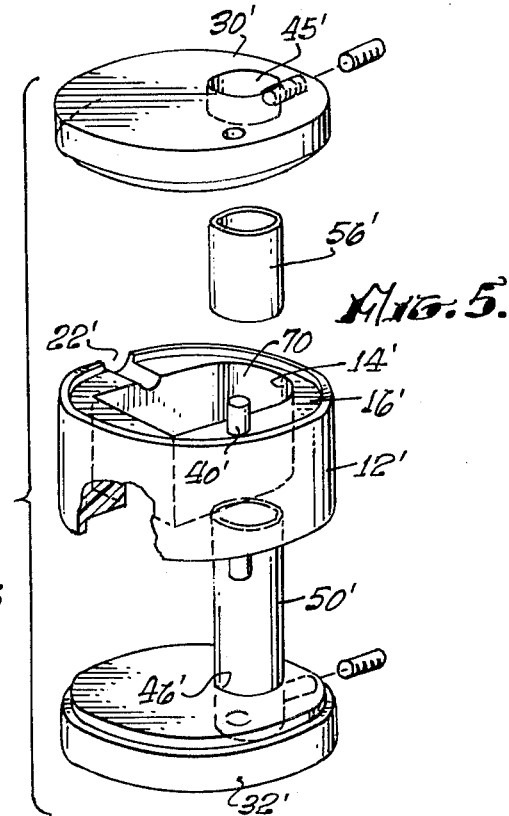
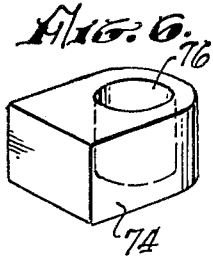
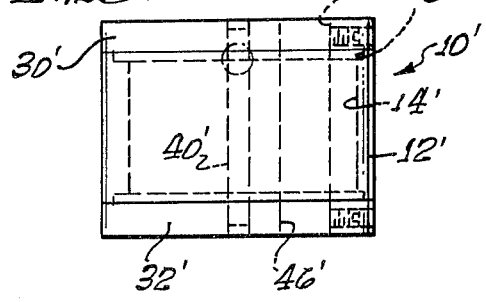

MOLD APPARATUS FOR FORMING RINGS

BACKGROUND OF THE INVENTION

1. Field of the Invention

This invention relates to molds for forming wax castings and, more particularly, to a molding apparatus designed to form various preselected wax castings whereby rings are produced therefrom.

2. Description of the Prior Art

There are various known types of molds and castings in the prior art and each takes a different shape and form to accomplish the end result of a finished product. However, these devices have never been designed specifically to form castings for finger rings, whereby the rings can be created and produced in large quantities under very simple conditions. Most casting processes involve complicated procedures. With particular respect to the forming of rings, many hours are spent with an alcohol lamp and ring mandrils in order to produce a single band. Thus, production is limited not only in custom-made rings, but in the average ordinary type as well.

SUMMARY OF THE INVENTION

The invention provides a method and means for producing any size or shape of ring, the means being a mold apparatus in which a multiplicity of ring designs can be formed by the use of pre-determined wax castings created within the mold.

The mold apparatus comprises a drum housing having a pair of end plates which are removably secured on either side of the drum housing, thereby forming a hollow cavity or mold chamber therein. A support mandril is disposed within the chamber or cavity, the mandril being removably secured to respective end plates at each end thereof.

Adapted to be received and removably disposed within the mold cavity is a ring-sizing band, wherein the thickness of the band selected therein will determine the overall size and thickness of the wax casting from which the ring is created.

Due to the different sizes of fingers in every individual there is included a finger-sizing band which determines the size of the finger opening in a particular ring mold. This finger sizing band is a tubular member adapted to be received over the tubular support mandril. When both the ring-sizing band and the finger-sizing band are positioned within the mold cavity in the proper relationship, a hot casting wax is injected into an injection inlet port arranged between the upper end plate and the wall of the drum housing.

To further allow passage of the casting wax to reach the mold cavity between the bands, the ring-sizing band is provided with a notch which aligns with the inlet port, thus allowing the wax to flow into the mold-casting cavity. Within the main mold housing an alignment pin is positioned having one end thereof adapted to be removably received in the end plate, providing part of the inlet port for the hot wax.

In addition, each ring-size band includes a vertical groove which also receives a portion of the alignment pin, whereby the notch is always aligned with the inlet port. Thus, the process used to form a pre-determined ring configuration is very simple.

Accordingly, one selects the size of each sizing band to be used and positions the band within the cavity of the mold housing. Generally, a ring mold spray is used so that the wax may be easily removed after injection therein. Wax is then injected into the injection inlet port by a well known wax injector, wherein the wax is forced into the mold cavity formed by each sizing band.

The wax will cool rapidly and, when a silvery hue is visible through the clear plastic of the mold members, the members are then disassembled and the molded wax cast is removed.

As is well known to those in the art, after the detailed carving and custom designing of the casted wax metal ring is formed therefrom in the well known manner, which is not herein described, due to the fact it is not part of the present invention and is well understood by those in the art of castings.

It should be noted that the cavity of the main housing can be provided with various configurations, wherein an alternative arrangement is contemplated whereby the cavity therein is formed with the familiar D-shaped configuration. Thus, a D-shaped ring can be adapted with either a high or low table.

OBJECTS AND ADVANTAGES OF THE INVENTION

It is an object of the invention to provide a mold apparatus whereby wax castings for rings can be produced in a very simple manner under very simple conditions.

Still another object of the present invention is to provide a mold apparatus wherein a multiplicity of sizes and designs of rings can be interchanged very easily, with a unique result heretofore unobtainable.

A further object of the invention is to provide a mold apparatus having a main body mold which receives various sized finger bands, whereby each ring can be produced with the required design for the finger opening therein.

A still further object of the invention is to provide a mold apparatus forming a wax casting to produce rings therefrom, wherein the operation of the apparatus can be controlled by the average individual without any special training.

It is another object of the invention to provide a mold apparatus, for making wax castings to produce rings therefrom, that is inexpensive to manufacture.

It is still another object of the invention to provide an apparatus of this character that is simple in construction and operation.

Other characteristics, advantages and objects of this invention can be more readily appreciated from the following description and appended claims. When taken in conjunction with the accompanying drawings, this description forms a part of the specification, wherein like references and characters designate corresponding parts in several views.

BRIEF DESCRIPTION OF THE DRAWINGS

Referring more particularly to the drawings, which are for illustrative purposes only:

FIG. 1 is a perspective view of the present invention fully assembled to receive the hot wax therein to form a wax casting;

FIG. 2 is an enlarged, cross-sectional view taken substantially along line 2 — 2 of FIG. 1;

FIG. 3 is an exploded perspective view of the apparatus with all the related parts thereto;

FIG. 4 is a side-elevational view of an alternative arrangement of the mold apparatus;

FIG. 5 is an exploded perspective view of the apparatus as seen in FIG. 4; and

FIG. 6 is a wax casting that is formed in the main mold body as shown in FIG. 5.

DESCRIPTION OF THE PREFERRED EMBODIMENT

Referring more particularly to the drawings, there is shown an apparatus embodying the invention, which is referred to as a mold apparatus, for forming a wax casting whereby a ring is produced as an end result therefrom. The mold apparatus is generally indicated by numeral 10, as seen in FIG. 1.

The apparatus comprises a drum member 12 defining a main mold housing having a bore 14 centrally disposed therein, which provides the chamber wherein the castforming elements are received.

The body of the drum housing 12 is formed with oppositely disposed, annular recesses 16 and 18, respectively. Recess 16 is referred to as the upper recess because it includes an annular flange 20 wherein a channel 22 is arranged to provided a means by which the well-known, hot-wax injector is received therein. The hot wax injector is not herein described or shown, since it is not part of the present invention and is well known in the art.

As part of the recess 16 there is formed an abutment shoulder 24 which also includes channel 22. Thus, channel 22 freely communicates with the bore 14.

The lower recess 18 is similar to recess 16 but does not include a means by which hot wax can be injected therein. Recess 18 only includes an annular flange 26 and an abutment shoulder 28, as seen in FIG. 2 thereof.

Both recesses 16 and 18 are adapted to snugly receive end plates or caps 30 and 32, respectively, therein. That is, each end plate is provided with an annular groove 34 and 36, respectively, and is arranged to fit and match its respective flange 20 and 26 — thus, closing off each opened end of the drum housing 12 and thereby forming a casting chamber. The upper end plate 30, includes a second channel 38 which is aligned with the first channel 22 of the housing 12, whereby injection inlet 39 is formed thereby.

The alignment of said channels is accomplished by an alignment means comprising an alignment pin 40 which is vertically disposed within a bore 42 located in the wall of said housing and positioned directly opposite said channel 22. Hence, end plate 30 is provided with a hole 44 disposed therethrough in direct alignment with pin 40, as seen in FIGS. 2 and 3, wherein pin 40 is inserted therein. This, then, provides alignment of respective channels 22 and 38.

End plates 30 and 32 must be held in a rigid and a tight relation with respect to the housing 12; and this is accomplished by including within each plate a central aperture 45 and 46, respectively. Aperatures 45 and 46 are axially aligned with bore 14, in which a support means passes therethrough and is affixed therein by set screws 48 which are received in laterally extending, threaded bores 49 arranged within each plate.

In FIGS. 1 – 3 the support means is shown as a tubular support post 50. Generally, the support post 50 would be fixedly positioned within aperture 46 of plate 32; and then both elements are arranged with housing 12, at which time mold-sizing means are selected and positioned within the bore 14.

The mold sizing means comprises a plurality of various mold sleeves, each having a particular inside diameter, which are referred to as ring-sizing bands, indicated at 52. Each sizing band includes a notch 54 to correspond to the injection inlet 39 and is always positioned adjacent thereto, as seen in FIG. 2. The band also includes a vertical groove 56 adapted to slide over the exposed portion of pin 40 which protrudes inwardly within bore 14 of housing 12. Thus, said sizing band 52 can only be received in bore 14, so that channel 22 and notch 54 are aligned.

A second group of mold sleeves are included and these are referred to as finger-sizing bands 56. Again, each finger-sizing band determines the size of the ring opening to fit a particular size finger. Finger sizing is well known in the art of producing rings and, therefore, each of the finger sizing bands 56 will have a different outside diameter, the inside diameter being that of the support post 50 whereby the band is positioned thereon.

Accordingly, after one determines the size of the ring and the size of the finger receiving it, each is placed within bore 14, thus forming a casting cavity 60 disposed between each band 52 and 56, as seen in FIG. 2.

At this time, cap or plate 30 is positioned to close the drum housing 12 because it is disposed over the upper end of post 50. The set screw 48 is tightened thereon, thus completing the mold which is now ready to receive the hot wax-casting material 62 through inlet 39 into said casting cavity 60.

Once the molten wax 62 is deposited within the cavity 60 it cools rapidly. When the wax turns a silvery hue which is visible through the housing 12 and band 52 — said housing and band being made of a transparent plastic material — the wax-formed ring casting 65 can be removed and then shaped as desired.

Thus, a variety of shapes and designs are now made possible.

Referring now to FIGS. 4 and 6, there is shown an alternative arrangement of the mold elements. First, the main housing 12' includes a channel 22' and an alignment pin 40'. Hence, the housing 12' is designed similar to housing 12, with the exception that bore 14' is provided with a different configuration, known as a D-shaped mold. Thus, the ring-sizing band are not required in this embodiment.

Each housing is formed with various sized D-shaped bores. However, finger-sizing bands 56' are still required and are disposed over a support post 50', wherein said post is positioned off center with respect to the end plates 30' and 32'. Post 50' is received in each respective end plate, wherein said end plates are also provided with matching eccentric apertures 45' and 46', respectively. Therefore, said post 50' passes through the central, semi-circular portion 70 of the D-shaped bore 14', which forms the finger-receiving opening 76 of the D-shaped, wax casting 74, as seen in FIG. 6.

The invention and its attendant advantages will be understood from the foregoing description and it will be apparent that various changes may be made in the form, construction and arrangement of the parts of the invention without departing from the spirit and scope thereof or sacrificing its material advantages, the arrangements hereinbefore described being merely by way of example, and I do not wish to be restricted to the specific form shown or uses mentioned, except as defined in the accompanying claims.

I claim:

1. A mold apparatus for forming various sized wax castings for finger-rings, comprising:
   a drum-housing, slightly larger than a finger ring; having a casting-bore disposed therein;
   a lower end-plate arranged to be removably received over the lower end of said drum-housing;
   an upper end-plate arranged to be similarly removably received over the upper end of said drumhousing;
   said drum-housing and said upper and lower end-plates thereby defining a casting chamber therein;
   means, comprising a single supportpost, for removably securing said endplates to said drum-housing;
   said support-post being positioned in the finger-opening of the wax-casting of a finger-ring;
   said support-post coacting with said drum-housing to define a casting cavity corresponding to the wax-casting of a fingerring;
   means positioned within said mold apparatus for allowing the wax casting material to be injected therein;
   finger sizing means, comprising one of a variety of predeterminedsized finger-ring bands adapted to be removably positioned within said casting bore, to encircle the outer surface of said support-post, for establishing the size of the finger-opening of the wax casting of a finger ring;
   ring sizing means, comprising one of a variety of predetermined-sized ring bands adapted to be removably positioned within and adjacent the inner surface of drum-housing, for establishing the overall size of the wax-casting of a fingerring.

2. A mold apparatus as recited in claim 1, wherein said securing means for said end-plates comprises:
   said single support-post, wherein each end thereof is removably secured to respective end plates; and
   securing means mounted within said endplates for direct engagement with said support post.

3. A mold apparatus as recited in claim 2, wherein said means for allowing the wax casting material to be injected into said mold apparatus comprises:
   a first casting-channel formed in the upper annular edge of said drumhousing; and
   a second casting-channel formed in the lower edge of said upper end-plate; said casting-channels being adapted, when in alignment, for forming an injection inlet port;
   means, comprising one alignment-pin, for aligning said casting-channels of said drum-housing and said upper endplate, for forming said injection inlet port.

4. A mold apparatus as recited in claim 3, wherein said ring-sizing band includes:
   a casting-channel disposed in one annular edge thereof for alignment with said injection inlet port, whereby the wax material can pass therethrough; and
   an alignment groove positioned in the peripheral wall of said ring-sizing band for direct engagement with said vertical alignment-pin.

5. A mold apparatus as recited in claim 2, wherein said casting bore is provided with a substantially D-shaped configuration and wherein said single support post is positioned in the fingeropening of said D-shaped casting bore, but is displaced from the central axis of said drum-housing.

* * * * *